Jan. 27, 1942.   O. H. GALLAMORE   2,270,858
CHAIN
Filed July 26, 1939   2 Sheets-Sheet 1

INVENTOR.
OLIVER H. GALLAMORE,
BY
ATTORNEYS.

Jan. 27, 1942.  O. H. GALLAMORE  2,270,858
CHAIN
Filed July 26, 1939   2 Sheets-Sheet 2
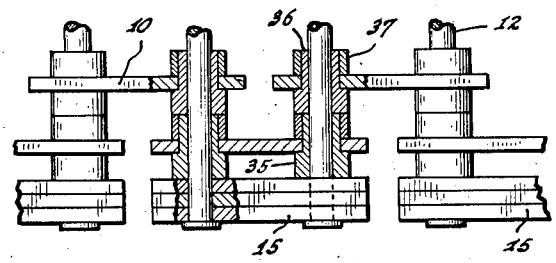
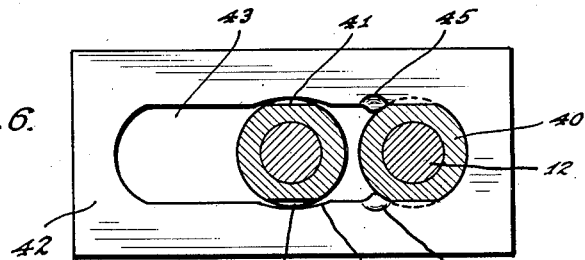
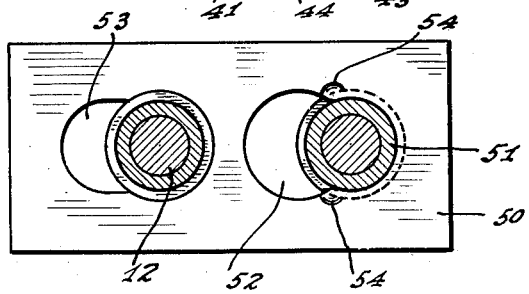
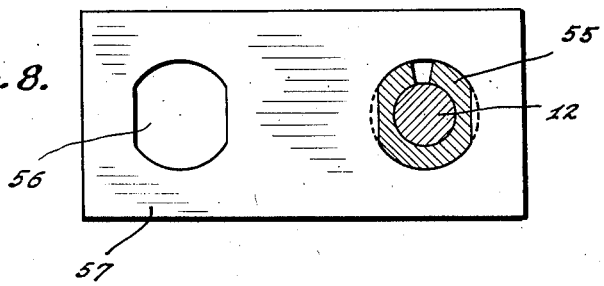
INVENTOR.
OLIVER H. GALLAMORE,
BY
ATTORNEYS.

Patented Jan. 27, 1942

2,270,858

UNITED STATES PATENT OFFICE 2,270,858

CHAIN

Oliver H. Gallamore, Indianapolis, Ind., assignor to Diamond Chain and Manufacturing Company, Indianapolis, Ind., a corporation of Indiana Application July 26, 1939, Serial No. 286,550

4 Claims. (Cl. 198—193)

My invention relates to a type of chain such as is commonly used to form a conveyor, and more specifically to conveyor chains which are subjected in use to relatively wide temperature variations. An example of such a chain is the type used in conveying glass articles through lehrs.

Such a chain commonly comprises spaced rows of bars set vertically, the bars in adjacent rows being staggered and each bar being provided with a pair of spaced bushings. Pins extending through the bushings serve to interconnect the bars to form a continuous chain. Desirably, the bushings project laterally beyond the sides of the bars for engagement with the teeth of chain-driving sprockets and also, by engaging the bushings on adjacent bars, to maintain the bars in proper spaced relationship laterally of the chain. In such a chain, lateral spacing of the bars and proper engagement of the sprockets with the chain are dependent upon the fit of the bushings within the bars. Although the bushings may originally have a tight fit within the bars, the influence of repeated temperature variations tends to loosen them with the result that wear occurs between the bushings and the bars, and the bars may eventually become so loose on the bushings that they move axially therealong and jam on the sprocket or sprockets by which the chain is driven.

It is the object of my invention to produce a chain of this type in which relative movement of the bushings and bars axially of the bushings is prevented, thus insuring that the bars will always be maintained in proper positions transversely of the chain and will not interfere with engagement of the chain with the chain-driving sprockets.

In carrying out my invention, I provide the bushings exteriorly with grooves having a width approximately equal to the thickness of the bars in which the bushings are to be received; and I so form the bars that they are received in such grooves, the sides of the grooves forming shoulders which engage opposite side faces of the bars. Since each bar is definitely located axially of its associated bushings by reason of its reception in the bushing-grooves, relative movement of the bar and bushings transversely of the chain is prevented.

Figure 1:
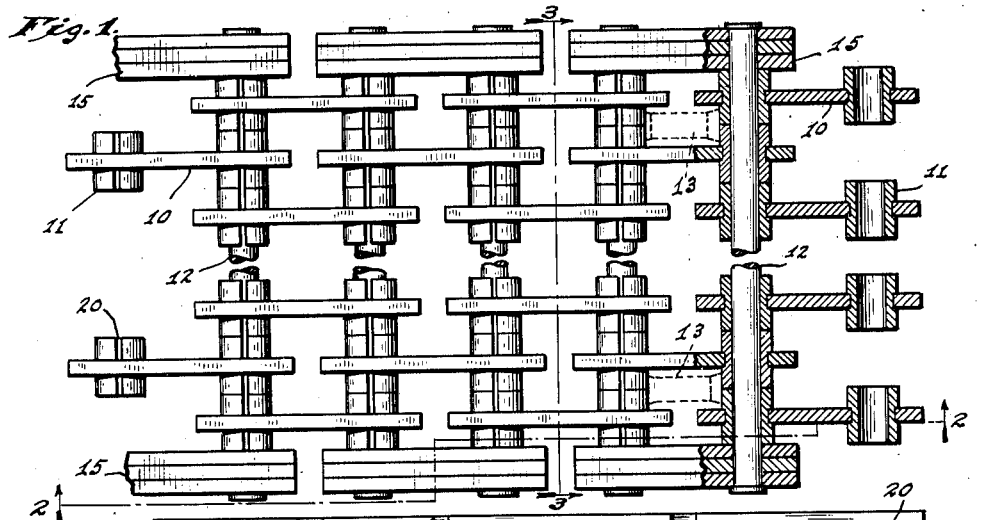
Figure 2:
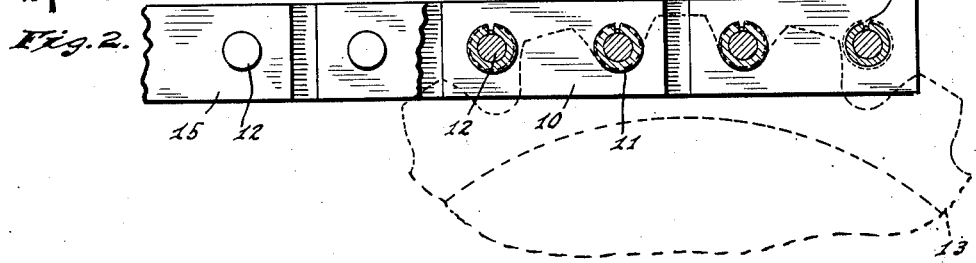
Figure 3:
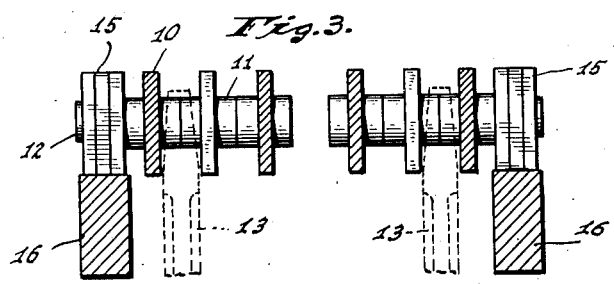
Figure 4:
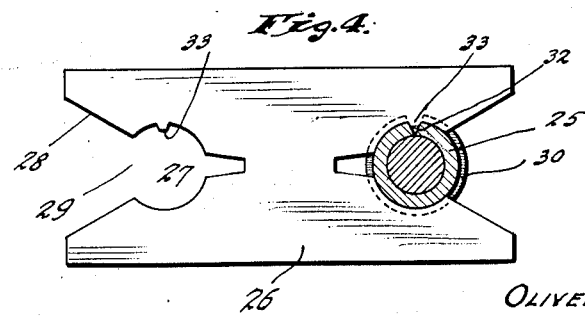

The accompanying drawings illustrate my invention: Fig. 1 is a plan view of a conveyor chain; Fig. 2 is a side elevation of the chain shown in Fig. 1, in partial section on the line 2—2 of Fig. 1; Fig. 3 is a transverse section on the line 3—3 of Fig. 1; Fig. 4 is an elevation of a link of modified form; Fig. 5 is a view similar to Fig. 1, but illustrating a further modification of the invention; and Figs. 6, 7, and 8 are views similar to Fig. 4 illustrating still further modifications.

The body of the chain illustrated in Figs. 1 to 3 is composed of a plurality of rows of bars 10, arranged with the bars in adjacent rows in staggered relationship. Each of the bars 10 is provided near its ends with holes for the reception of bushings 11 which, in turn, receive pins 12 extending transversely of the chain for the entire width thereof. Each bushing 11 has a length greater than the thickness of its associated bar 10 and the bushings therefore project laterally beyond the sides of the bar into abutting relationship with the bushings of bars in adjacent rows, thus serving to hold the links in transversely spaced relationship to permit the entry between adjacent links of the teeth of sprockets 13 by means of which the chain is driven. At the sides of the chain there may be links 15 which are not provided with bushings and which may slidably engage stationary guides 16 by which the weight of the chain and the articles it conveys may be sustained.

In the arrangements shown in Figs. 1, 2, and 3, each of the bushings 11 has an external diameter somewhat greater than the diameter of the holes in the bars 10 and is provided with an annular groove intermediate its ends, such groove having a width approximately equal to the thickness of the bars 10 and a base diameter substantially equal to or slightly greater than that of the holes in the bars. In the arrangement illustrated in Figs. 1 to 3, each of the bushings 11 is also provided with an axial slot 20 extending through the bushing-wall to render the bushing collapsible to the extent necessary to permit it to be forced into the associated hole in the bar 10. When the bushing has been inserted into the bar to a point such that the groove and bar occupy a co-planar relationship, the bushing expands, and the bar becomes seated in the groove, as indicated at the right in Fig. 1.

After the bushings have been inserted in the bars, the chain is assembled by pasisng the pins 11 through the bushings of the various bars 10 and through the links 15, the pins being held in place as by spinning their ends into heads. Desirably, each groove in each bushing has a depth somewhat greater than the clearance between the bushing and the pin 12 which it receives. Thus, the presence of the pin 12 within the bushing will prevent the bushing from collapsing to an extent such that the associated bar 10 can move axially along it.

In Fig. 4 I have illustrated an alternative construction in which the resilience necessary to seat the grooved bushings in each bar is provided in the bar rather than in the bushing. The bushing 25, which is shown as rolled from flat stock the ends of which meet, is not radially collapsible. Each bar 26 is slotted longitudinally at each end, desirably to a point inwardly beyond the bushing-receiving hole 27, to permit the hole 27 to be expanded to the extent necessary to receive the bushing. If desired, the slot at each end of the bar may be widened and flared outwardly, as indicated at 28, to leave adjacent the hole 27, a neck or constriction 29 having a width somewhat less than the base diameter of the annular groove 30.

In the construction illustrated in Fig. 4, each bushing 25 may be inserted in its associated bar by forcing it inwardly through the enlarged slot-end 28 into the hole 27, the bar springing to permit the grooved portion of the bushing to pass the constriction 29. After the grooved bushing-portion has passed the constriction 29, the link again assumes its original form and the bushing is held in place.

It may be desirable, under certain circumstances, to prevent rotation of each bushing in its associated bar; for such rotation might result in wear sufficient to enlarge the holes in the bars to a point where the bars could move axially of the bushings over the larger-diameter end portions thereof. To prevent relative rotation of the bushings and bars, I may provide each bushing with a longitudinal groove, as indicated at 32 in Fig. 4, and each bar with a projecting tongue or key 33 positioned to enter such groove and hold the bushing against rotation. If the bushing is formed of flat stock rolled to the desired cylindrical shape, the groove 32 is readily provided by properly shaping the ends of the material before it is rolled into cylindrical form.

In the arrangement illustrated in Fig. 5, each of the bushings is formed of two pieces—namely, a bushing-body, having a head 35 and a shank 36, and a spacing collar 37. The spacing collar 37 has an internal diameter substantially equal to that of the shank 36, an external diameter substantially equal to that of the head 35, and a length such that when flush with the outer end of the shank 36 it will be spaced from the head 35 a distance substantially equal to the thickness of the bars 10. This chain can be assembled without distortion of any of the parts, the bushing-shank 36 being passed through the hole in the associated link 10 and the spacing collar 37 then placed over the projecting end of the shank. The bushing-bodies on each pin 12 are arranged in corresponding positions so that each spacing collar 37 abuts against the head 35 of the adjacent bushing, thus serving to maintain the bars 10 in proper positions transversely of the chain.

Instead of providing the bushings with annular grooves as in the modifications so far described, I may provide them with grooves which do not extend throughout the bushing-circumference. Thus, in Fig. 6, I have illustrated bushings 40 provided with diametrically opposite grooves 41 the bottoms of which are flat and parallel to each other. The bar 42 shown in Fig. 6 has a longitudinally extending slot 43 the width of which approximates the distance between the bottoms of the grooves 41 and the ends of which are curved on a radius substantially equal to the radius of the bushings 40. Near its longitudinal center, the groove 43 is enlarged as indicated at 44 to a width equal to the diameter of the bushings 40. In this construction, the two bushings associated with each bar 42 are put in place successively, each bushing being inserted by axial movement into the enlarged portion 44 of the slot 43 and then moved longitudinally of such slot to one end thereof, where the sides of the grooves 41 will engage the sides of the bar 42 and prevent relative movement of the bushings and bar axially of the bushings. To hold the bushings in place in the ends of the slot 43 the material of each bar may be swaged as indicated at 45 to constrict the slot 43 adjacent each bushing.

In the modification illustrated in Fig. 7 each bar 50 is provided with two longitudinally spaced slots, and the bushings 51 are provided with annular grooves. The inner end 52 of each of the slots is formed as the segment of a circle having a diameter approximating the external diameter of the bushings 51, while the outer end 53 of each slot is formed as a segment of a circle having a diameter approximating the base diameter of the bushing grooves. The bushings are put in place by inserting them in the inner slot-portions 52 until the bushing grooves are co-planar with the bar, following which the bushings are moved outwardly into the slot-portion 53. To retain the bushings in place in the slot-portions 53, the material of the bar may be swaged as indicated at 54 to constrict the slot after the bushings are in place.

In the arrangement illustrated in Fig. 8, I employ bushings 55 which are collapsible like the bushings 11 of Figs. 1, 2, and 3. Each of the bushings 55 is provided with diametrically opposite grooves similar to the grooves 41 in the bushings 40 shown in Fig. 6. The holes 56 in the bars 57 in which the bushings 55 are mounted conform in shape to the cross-sectional shape of the bushings 55 in the plane of the grooves referred to. In this structure, the bushings are collapsed and inserted in the holes 56 until the bushing-grooves are in the plane of the bar 57, whereupon the bushings expand of their own resilience. When the chain is assembled, the pins 12 within the bushings 55 prevent the bushings from collapsing and insure that each bar 57 will remain seated in the grooves of its associated bushings.

I claim as my invention:

1. A chain adapted for use under widely varying temperature conditions and having a plurality of rows of links interconnected by transversely extending pins, each of said links comprising a bar element having two longitudinally spaced holes through which adjacent pins pass, at least one of the holes in said bar element being provided with a bushing element mounted in the hole and receiving the associated pin, said bushing element being provided exteriorly and intermediate its length with one or more circumferentially extending grooves located in the plane of the bar element, one of said elements being split and resiliently distortable to permit the bushing element to be received in the associated hole in the bar element with the bar element received in the bushing-grooves and with the side walls of said grooves engaging opposite side faces of the bar element to hold the bushing element in fixed position axially of itself relative to the bar element even if said bar element expands relatively to said bushing element as the result of temperature conditions to which the chain is subjected in use.

2. The invention set forth in claim 1 with the addition that it is said bushing element which is split, it being provided with a longitudinal slot extending through its wall to permit collapse of the bushing element incident to its insertion into the associated hole in the bar element.

3. The invention set forth in claim 1 with the addition that it is said bar element which is split, it being provided with a slot which extends outwardly from the bushing-receiving hole to the adjacent end of the bar element to permit distortion of the bar element incident to the insertion of the bushing element.

4. The invention set forth in claim 1 with the addition that each of said bushing elements and its associated bar element are provided with cooperating, radially overlapping provisions positively preventing rotation of the bushing element in the bar element.

OLIVER H. GALLAMORE.